United States Patent [19]

Herbert

[11] Patent Number: 5,144,222
[45] Date of Patent: Sep. 1, 1992

[54] APPARATUS FOR CONTROLLING THE INPUT IMPEDANCE OF A POWER CONVERTER

[76] Inventor: Edward Herbert, 1 Dyer Cemetery Rd., Canton, Conn. 06019

[21] Appl. No.: 650,914

[22] Filed: Feb. 5, 1991

Related U.S. Application Data

[63] Continuation-in-part of Ser. No. 638,197, Jan. 7, 1991.

[51] Int. Cl.⁵ .................................................. G05F 1/40
[52] U.S. Cl. ...................................... 323/271; 323/282; 323/351
[58] Field of Search ................... 307/82; 323/266, 267, 323/271, 272, 282, 285, 351; 363/34, 37, 65, 71

[56] References Cited

U.S. PATENT DOCUMENTS

| | | | |
|---|---|---|---|
| 3,913,000 | 10/1975 | Cardwell | 363/24 |
| 3,914,617 | 10/1975 | Corbel | 323/271 |
| 4,034,232 | 7/1977 | LaVenture | 307/82 |
| 4,384,321 | 5/1983 | Rippel | 363/81 |
| 4,713,742 | 12/1987 | Parsley | 323/351 |
| 4,816,739 | 3/1989 | Sakurai et al. | 363/65 |

Primary Examiner—Steven L. Stephan
Assistant Examiner—Jeffrey Sterrett
Attorney, Agent, or Firm—Paulding & Huber McCormick

[57] ABSTRACT

A DC-DC power converter, which can be adapted for use with a single- or multiple-phase AC input, uses energy control because it transcends the modulators and is linear. The use of feed back control is minimized by the use of feed forward control, and in particular the feed forward of the output power to control the input power. The dynamic resistance of the input is controlled, ensuring high power factor in the AC input embodiments of the converter. A multiple-input buck derived converter can have parallel or series inputs, and one or more of the inputs can be lower than the output, even zero or negative. A multiple output boost derived converter can have parallel or series outputs, and one or more of the outputs can be lower than the input, even zero.

10 Claims, 10 Drawing Sheets

APPARATUS FOR CONTROLLING THE INPUT IMPEDANCE OF A POWER CONVERTER

This is a continuation-in-part of co-pending application Ser. No. 638,197, filed on Jan. 7, 1991.

BACKGROUND OF THE INVENTION

The present invention relates generally to power converter systems, in particularly to DC-DC power converters, DC-DC power converters having input rectifiers to adapt them for single- or multi-phase AC-DC power conversion, and AC-DC power converters having control algorithms to improve power factor.

It is well known that an input power source is often not suitable for direct application to the load, and that power conversion is necessary. It is a well established art to provide power conversion from one voltage and current level to another voltage and current level, and a high degree of sophistication has been achieved in the control and protection circuits of such converters.

It is less well recognized that the rate at which energy is delivered to the load and the rate at which energy is received from the input power source are often incompatible. The problem is usually recognized in the context of "noise rejection" and "frequency response to transients". It is generally addressed through the use of L-C filters and feed back control loops. The L-C filters, being resonant, are a source of some problems.

A sub-set of power converters, known generally as "high power factor AC-DC converters" does control the rate at which energy is received from the input power source to provide high power factor. However, these converters are characteristically plagued with problems of energy management. Usually the voltage of a storage capacitor is sensed and used as feed-back to correct the input current control function. If its gain is too high, the power factor is compromised. The input current control function can be held constant using a latching function for each half cycle of the input AC voltage. While providing excellent power factor correction, the latching function creates a sampling limitation in the cross over frequency of the feed back control loop. Input voltage feed forward can be used to improve the response to transients in the input voltage. None the less, energy control tends to be poor, the storage capacitor is generally unnecessarily large and the control is generally subject to poor response and large overshoots.

The high power factor AC-DC converters typically have an input regulator, a storage capacitor and an output regulator essentially in series so that all of the output power must pass through both regulators.

High power factor AC-DC converters often use a boost converter for the input stage, which presents severe problems upon the application of input power and in overload conditions, or whenever the output voltage is lower than the input voltage.

It is an object of this invention to provide a DC-DC power converter in which the control of power flow and energy is improved.

It is a further object of this invention to provide an improved method of control of a DC-DC converter using feed forward techniques on the system input parameters, principally $V_o$, $I_o$, $V_i$ and $\eta$ (output voltage, output current, input voltage and efficiency).

It is a further object of this invention to provide an improved method of control of a DC-DC converter using feed forward techniques to control the converter dynamic response.

It is a further object of this invention to provide a DC-DC converter having controlled dynamic input resistance.

It is a further object of this invention to provide a DC-DC converter having parallel modulators for reduced losses.

It is a further object of this invention to provide a DC-DC converter using a two-input buck converter.

It is a further object of this invention to extend the application of the improved DC-DC power converter to applications requiring a single- or multi-phase AC input and to applications requiring high power factor.

It is a further object of this invention to provide a high power factor AC-DC converter using parallel modulators including a two-input buck converter, to overcome the problems associated with a boost converter input stage.

SUMMARY OF THE INVENTION

This invention teaches that the control of a DC-DC converter can be implemented using energy control, knowing the power of the input, the output and the losses, and knowing the energy content of the transients. This method of control transcends the modulators and is linear.

This invention also teaches that a control algorithm can be written as a function of the system input parameters, $V_o$, $I_o$, $V_i$ and $\eta$, and that this algorithm can be applied as a feed forward control.

This invention also teaches that parallel modulators can be used to provide energy control, with one path providing power directly to the output to the extent that the input power is sufficient, and with a parallel path providing energy storage. The parallel path provides energy to the output when the input power is insufficient, and stores energy when the input power is more than sufficient.

This invention also teaches that a two-input buck converter can be used in a DC-DC converter having parallel modulators, and that one of the inputs of the two-input buck converter can have a voltage which is lower than the output voltage.

This invention also teaches that a multiple input buck converter can be used to provide high power factor in a multi-phase AC-DC converter.

This invention also teaches the use of a multiple output boost converter.

BRIEF DESCRIPTION OF THE DRAWINGS

FIG. 14 shows the "off" state, and FIG. 15 defines the switch timing.

FIG. 14 is a block diagram of a three phase AC-DC converter.

DESCRIPTION OF THE PREFERRED EMBODIMENTS

Figure 1:
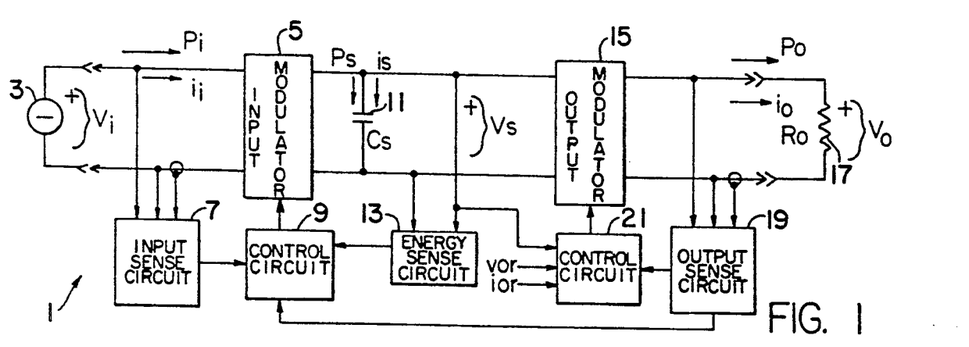
FIG. 1 shows a power converter having two modulators, energy storage and feed forward control.

FIG. 1 shows a DC-DC converter 1 having an input power source shown as a DC power source 3 providing power to an input modulator 5. An output modulator 15 provides power to an external load 17. The output of the input modulator 5 provides power to a storage capacitor 11 and to the input of the output modulator 15.

A input sensing circuit 7 senses the input power $p_i$, and may quantize input voltage $v_i$, input current $i_i$ and/or input power $p_i$. An output sensing circuit 19 senses the output power, and may quantize output voltage, $v_o$, output current $i_o$ and/or output power $p_o$.

An energy sensing circuit 13 measures the energy $w_s$ in the storage capacitor 11 as a function of the square of the voltage $v_s$ of the storage capacitor 11.

An output control circuit 21 implements an output control algorithm $K_o$ to control the output modulator 15. The inputs to the output control may be output voltage $v_o$, output current $i_o$ and the input voltage $v_s$ to the output modulator 15. The reference voltage and/or current to which control is maintained may be fixed or variable, internal or externally programmable. Provisions for external references are shown as $v_{or}$, $i_{or}$. The components comprising the output modulator 15, the output sensing circuits 19 and the output control circuits 21 essentially comprise a DC-DC converter having $v_s$ as its input power source and $v_o$ as its output. It may be a voltage regulator, and may have over current limiting. It may use feed back of the output voltage $v_o$ and current $i_o$, and may use feed forward of the input voltage $v_s$ to the output modulator 15. In many respects it is a DC-DC converter of usual design, well known to the art.

An input control circuit 9 implements an input control algorithm $K_i$ to control the input modulator 5. The inputs to the input control circuit may be the output voltage $v_o$, the output current $i_o$, or their product, the output power $p_o$, the input voltage, $v_i$, the input current $i_i$, and the energy in the storage capacitor $w_s$.

In operation, the input modulator 5, its input sense circuit 7, the energy sense circuit 13 and its control circuit 9 control and modulate the input power from the power source 3 so as to be compatible with the input power source 3 and to deliver the correct power to the output modulator 15. The output modulator 15, its output sense circuit 19 and its control circuit 21 control and modulate the output power as it is required for the output load 17. To the extent that the input power $p_i$ and the output power $p_o$ are momentarily different, energy is store in, or taken from, the storage capacitor 11. The methods of control are taught in more detail after several of the preferred embodiments are explained.

Figure 2:
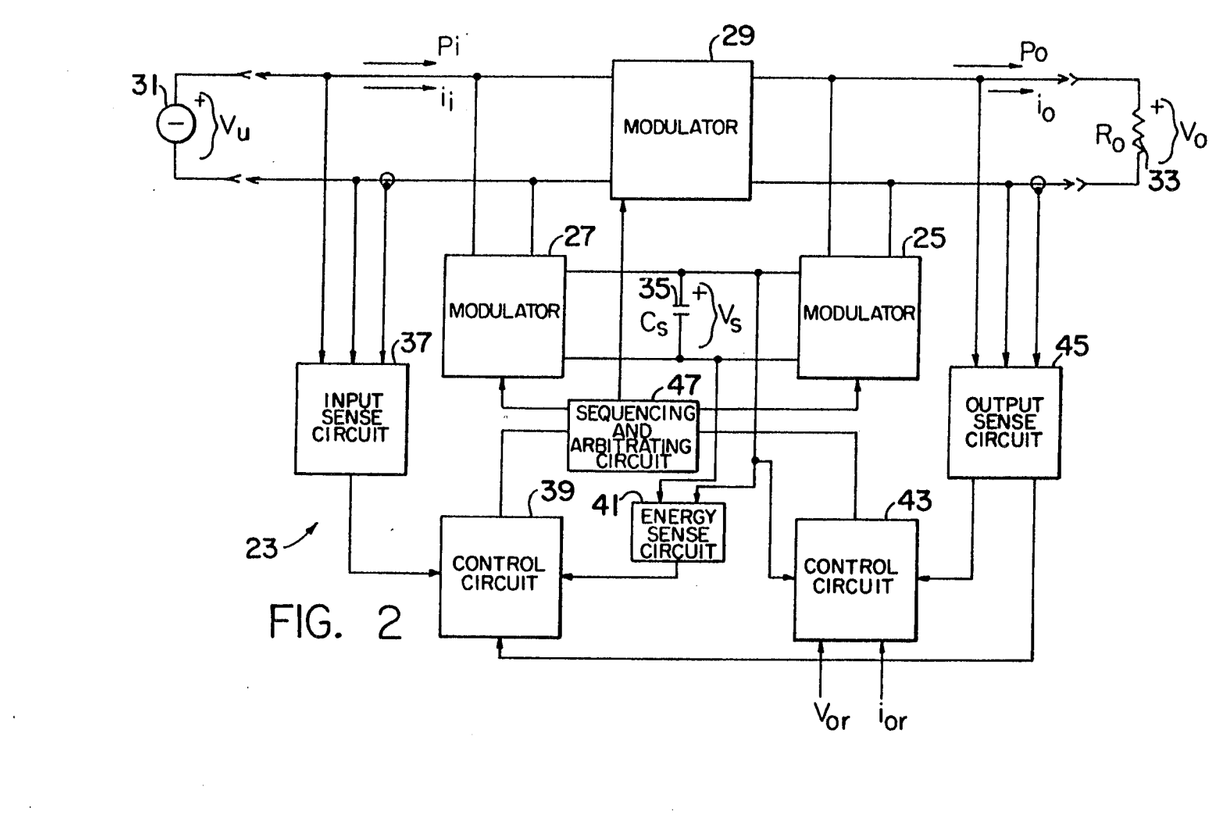
FIG. 2 shows a power converter having parallel modulators, energy storage and feed forward control.

FIG. 2 shows a DC-DC converter 23 having the same input and output, and the same sensing circuits and control circuits as the DC-DC converter of FIG. 1. However, it differs by the use of parallel modulators. A first modulator 29 receives power from the power source 31, and, to the extent that the power from the power source 31 is sufficient, the power is modulated and supplied to the external load 33. To the extent that the output power from the first modulator 29 is insufficient, a second modulator 25 takes energy from the storage capacitor 35, modulates it and supplies it as power to the external load 33. To the extent that the power from the power source 31 is more than sufficient, a third modulator 27 receives power from the power source 31, modulates it and supplies it to the storage capacitor 35 for storage as energy.

The sensing and control of the DC-DC converter of FIG. 2 are the same as the sensing and control of the DC-DC converter of FIG. 1 except for the addition of a sequencing and arbitrating circuit 47. In concept, the first modulator 2 is operated only until the control circuit 39 or control circuit 43 has its control function satisfied, whichever is first. If the control function of control circuit 43 is not then satisfied, the second modulator 25 is operated until it is. If the control function of control circuit 39 is not then satisfied, the third modulator 27 is operated until it is. In any control cycle, the operation of the second modulator 25 and the operation of the third modulator 27 is mutually exclusive.

Figure 3:
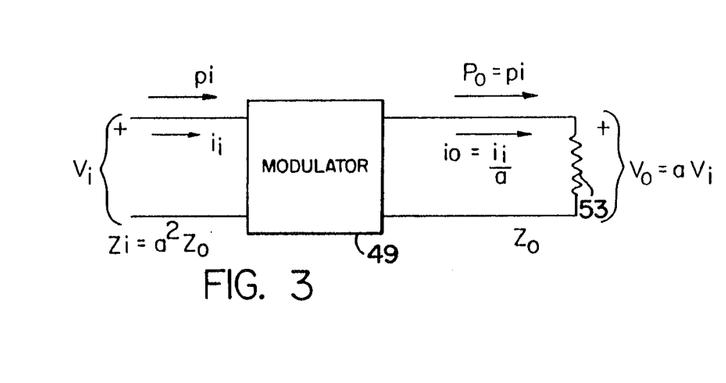
FIG. 3 defines a modulator.

FIG. 3 shows a modulator "A" and defines its function. Ideally, the input power and the output power are equal, and the modulator provides no energy storage. The modulator 49 converts the input voltage $v_i$ and input current $i_i$ to be compatible with an external load 53. The modulator factor in FIG. 3 is "a". The output voltage $v_o$ equals the input voltage $v_i$ times a. The output current $i_o$ equals the input current $i_i$ divided by a. The modulator factor may vary with time, under control.

Figure 4:
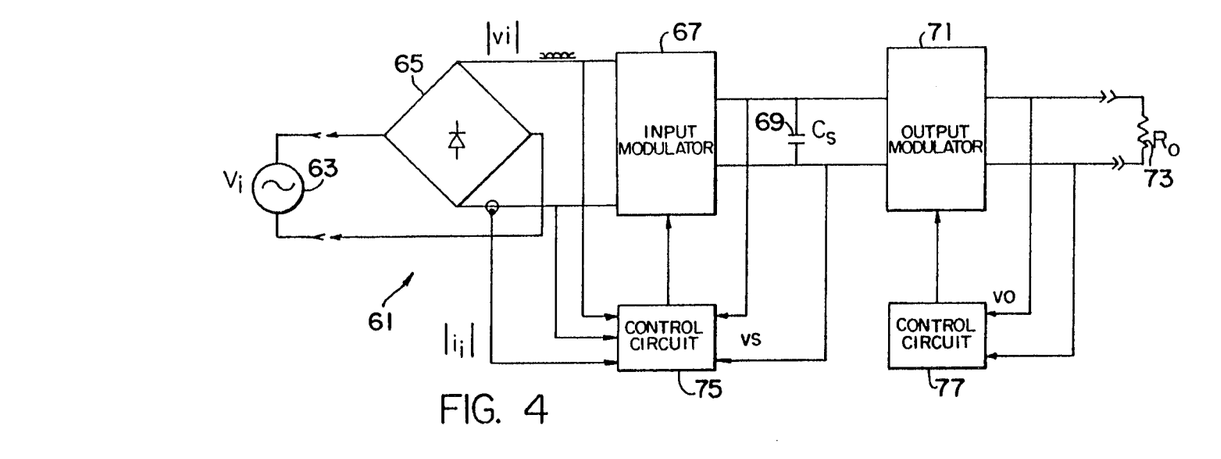
FIG. 4 shows a prior art high power factor AC-DC converter.

FIG. 4 shows present art, and is a "high power factor AC-DC converter" 61 having an AC input power source 63 and an input full wave rectifier 65 at its input. The input $v_i$ becomes $|v_i|$ at the input of the input modulator 67. The input modulator 67 has its output connected to a storage capacitor 69 and to the input of the output modulator 71, just a in the DC-DC converter of FIG. 1. The output of the output modulator 71 supplies power to an external load 73.

For high power factor, the input control circuit 75 will control the input modulator 67 so that its input current $|i_i|$ will be proportional to $|v_i|$. However, if the control constant $K_i$ is incorrect, over time the input power will differ from the output power, and either to much or too little energy will be stored in a storage capacitor 69. This results in an error in the storage capacitor voltage $v_s$, which is fed-back to modify the control constant $K_i$.

It is well known that if the feed-back control loop has too much gain and too high a crossover frequency, $K_i$ will not approximate a constant, and the power factor correction will be compromised.

Figure 5:
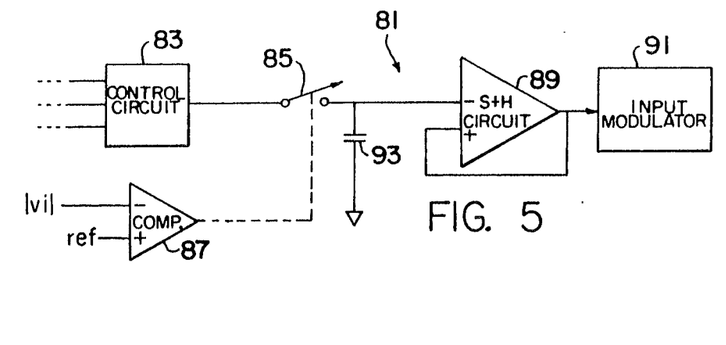
FIG. 5 shows a prior art sample and hold circuit.

To improve power factor correction, a sample and hold circuit 81 such as the one shown in FIG. 5 may be used. A comparator 87 senses the start of each half cycle of the input voltage and causes a switch 85 to close momentarily. The output of the control circuit 83 is thus connected to the sample and hold amplifier 89 and its holding capacitor 93. In this manner, the control factor $K_i$, as applied to the input modulator 91, is held constant until the next half cycle. This technique is known.

Figure 6:
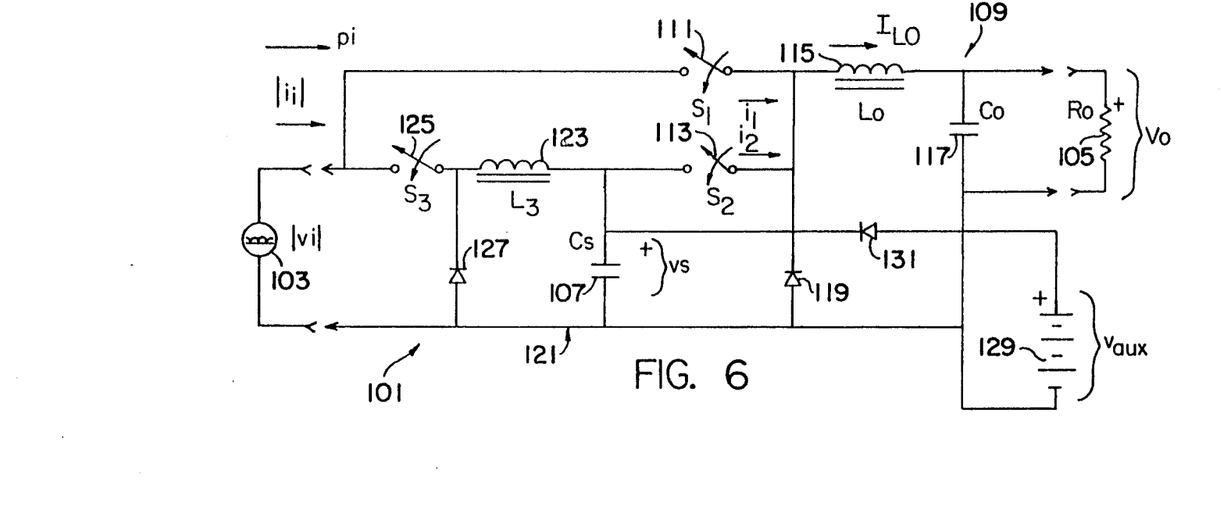
FIG. 6 is a schematic of the power circuits for a power converter using parallel modulators.

FIG. 6 shows the power circuits 101 of a DC-DC converter which would be suitable for implementing the DC-DC converter of FIG. 2. The sensing and control circuits are not shown. An input power source 103, shown as having the voltage wave form $|v_i|$ of a full wave rectified AC voltage, is connected to a first switch 111 and a third switch 125. The first switch 111 is part of a two input buck converter 109 comprising the first switch 111, a second switch 113, a rectifier 119, an inductor 115 and an output filter capacitor 117. The second switch 113 of the two input buck converter 109 is connected to the storage capacitor 107.

The third switch 125 is connected to a buck converter 121 comprising the third switch 125, a rectifier 127 and an inductor 123. The storage capacitor 107 is connected to the output of the inductor 123.

FIG. 6 also shows that the DC-DC converter 101 may have an auxiliary power source 129. This input can be connected through a rectifier 131 to the storage capacitor 107. The normal voltage $v_s$ on the storage capacitor 107 is higher than the auxiliary power source 129 so that the rectifier 131 is kept reverse biased. The auxiliary power source 129 has a higher voltage $V_{aux}$ than the minimum input voltage required by the converter 109 to maintain regulation.

In describing the operation of the DC-DC converter 101 of FIG. 6, it will be assumed to be ideal, at steady state conditions, and that the control circuits are configured for high power factor.

Because the input voltage $|v_i|$ is usually an independent variable, input power control is accomplished by controlling input current $|i_i|$. Further, for high power factor, the input resistance is controlled to be a fixed positive resistance. The input power is given by $$p_i = v_i i_i = V_i I_i \sin^2(\omega t) \qquad [1]$$

$$p_i = \frac{V_i I_i}{2} - \frac{V_i I_i}{2} \cos(2\omega t) \qquad [2]$$

In a sinusoidal AC voltage, the half power point occurs when the input voltage $|v_i|$ equals the RMS voltage $V_{iRMS}$. Therefore, when the input voltage $|v_i|$ is less than $V_{iRMS}$, the input power $p_o$ will be insufficient. When $|v_i|$ is greater than ViRMS, the input power $p_i$ will be more than sufficient.

Looking first at the buck converter 121, the converter 121 implements the M3 modulator function of FIG. 2, and is operative only when the input power is more than sufficient. This occurs when $|v_i| > V_{iRMS}$, so in accordance with the well understood principles of buck converter design, the voltage $v_s$ of the storage capacitor 107 can be any voltage which is less than the lowest RMS voltage of the input voltage source 103.

Looking now at the two input buck converter 109, usually a buck converter cannot have its input voltage less than the output voltage. In as much as $|v_i|$ goes to zero, buck converters usually cannot be used with a full wave rectified AC power source. However, in the two input buck converter 109, it is sufficient if one of its inputs is higher than the output voltage. If the one input is sufficiently higher than the output voltage, the other input can be lower than the output, even zero or negative. (With a negative input, the rectifier 119, which functions as a switch, would have to be a switch).

The control relationships of the two input buck converter 109 are given by $$V_o = D_1 |v_i| + D_2 v_s \qquad 3$$

$$i_1 = D_1 I_{Lo} \qquad 4$$

$$i_2 = D_2 I_{Lo} \qquad 5$$

$D_1$ and $D_2$ are the duty cycles of $S_1$ and $S_2$ respectively.

In describing the general operating concept of the converter of FIG. 2, it was implied that $S_1$ would operate first. In practice, it is preferred that $S_2$ operate just before $S_1$, to ensure that the inductor current $I_{Lo}$ is maximum, when $|v_i| \leq V_o$. This is a necessary condition for operating with discontinuous conduction. The operating time (closure) of the switches $S_1$ and $S_2$ must be mutually exclusive for this embodiment of the two input buck converter, unless diode isolation is provided.

Figure 7:
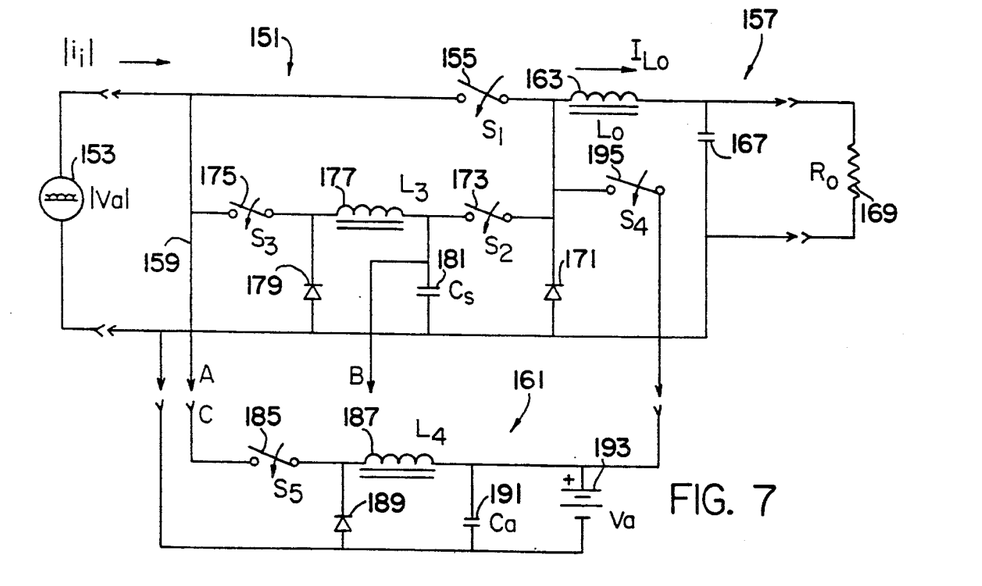
FIG. 7 is a schematic of the power circuits for a another embodiment of the power converter using parallel modulators.

FIG. 7 shows a converter, similar in many respects to the converter of FIG. 6, but having a different method of incorporating an auxiliary power source. An additional storage capacitor $C_a$ 191 and/or an auxiliary power source $v_a$, shown for illustration as a battery 193 is connected to a fourth switch 195, which in turn is connected to the input of an output inductor 163. The switch 195 can operate in cooperation with a first switch 155 and a second switch 173 as a three input buck converter generally designated as 157. In this manner, the voltage $v_a$ of the battery 193 is less restricted, and the capacitor 191 does not appear in parallel with the storage capacitor 181.

In certain methods of operation; the value of the storage capacitor $C_s$ would influence the algorithm. In the method illustrated in FIG. 7, any value capacitance $C_a$ could be added externally, as, for instance, for additional hold up time, without altering the system dynamics in other modes of operation. A buck converter comprising a fifth switch 185, a rectifier 189 and a third inductor 187 can provide a controlled charging circuit for the capacitor 191 and/or the battery 193. There is no theoretical restriction on the operation of the fifth switch 185 and the third switch 175, but if they are mutually exclusive, ripple currents in the input current are reduced, and they may have to be operated under common control for the input current characteristics to be correct. As a trickle charger, these effects may be negligible. The input "C" to the fifth switch 185 could alternatively be connected to the storage capacitor 181 using the alternate connection point "B".

Figure 8:
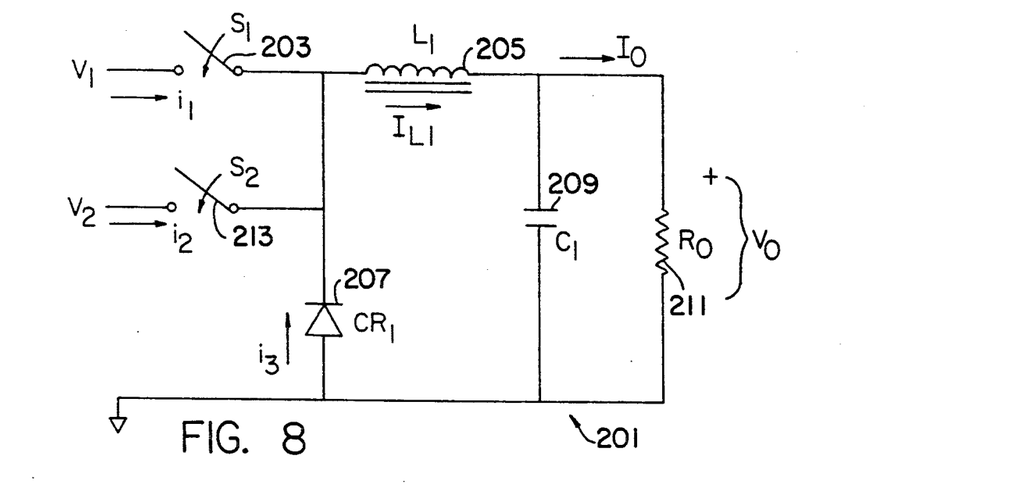
FIG. 8 shows a schematic of a two input buck converter.

FIG. 8 shows the two input buck converter alone, and indeed it can operate as a two input modulator 201 on its own merits, without the other circuits shown in the earlier figures. A first voltage $v_1$ connects to a first switch $S_1$ 203. A second voltage $v_2$ connects to a second switch $S_2$ 213. The other sides of both switches are common, and connect to an inductor $L_1$ 205 and a rectifier $Cr_1$ 207. The output of the inductor 205 connects to an output capacitor $C_1$ 209 and load 211 shown as a resistor $R_o$ and has a voltage $v_o$. A first input current $i_1$ is input from the first voltage source $v_1$. A second input current $i_2$ is input from the second voltage source $v_2$. The operation of the converter 201 of FIG. 8 is understood in more detail by reference to FIGS. 9a, 9b and 9c, which show different operating conditions.

Figure 9A:
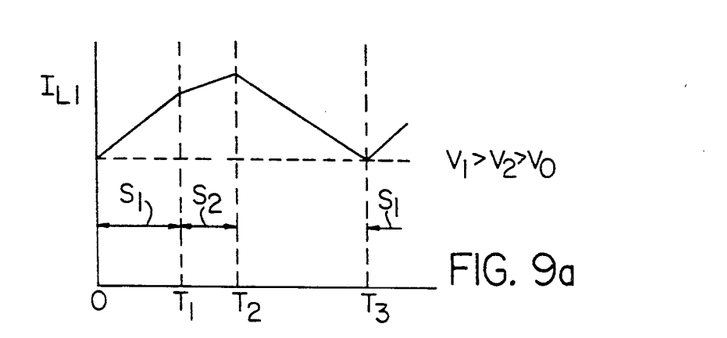
FIGS. 9a-9c show the currents in the two input buck converter for different combinations of input voltage.

FIG. 9a shows a condition in which $v_1 > v_2 > v_o$. The current wave form in the inductor $I_{L1}$ is normally a triangular wave form in a single input buck converter, and is familiar to those skilled in the art. A similar wave form would result with either switch $S_1$ or $S_2$ operating alone. With both switches operated, sequentially, the wave form is modified as shown. In a first time segment, $S_1$ is operated, and the current will increase at a slope determined by value of the inductor $L_1$ and the difference between $v_1$ and $v_o$. In the second time segment, switch $S_2$ is operated, and the current increases with a lower slope, because $v_2 < v_1$. Following that is a time of negative slope while the rectifier is conducting.

Figure 9B:
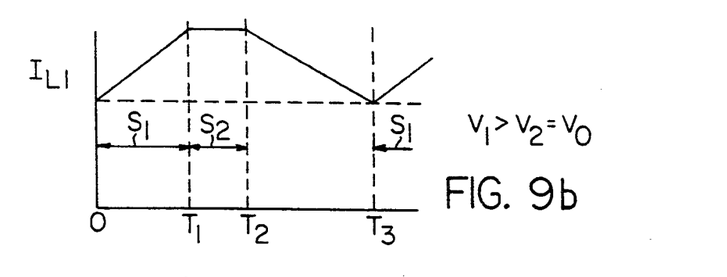
Figure 9C:
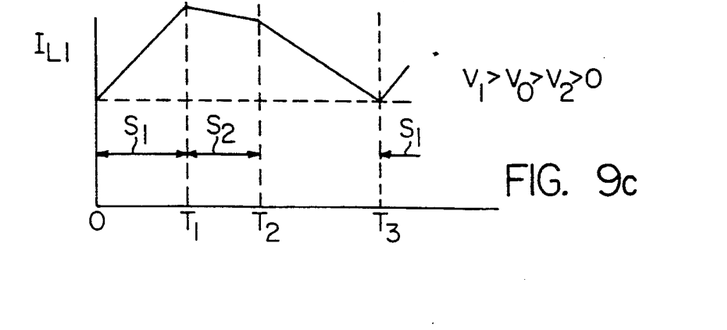

In FIG. 9b, the operation is similar, but in the second time segment when $S_2$ is operated, the slope of the current is flat, because $v_2 = v_o$. In FIG. 9c, the second time segment has a down slope, because $v_2 < v_o$. However, because $v_2 > 0$, it is not as steeply down as in the third time segment when the rectifier is conducting.

In this manner, it can be seen that the two input buck z>converter can be useful for operation with one of its inputs at a voltage which is less than the output. It is therefore usefull with a full wave rectified AC input, and could also be used to extract power to the extent that it were available from an input device which was operated at reduced power. Examples might be a battery that was mostly discharged, or a solar panel with low insolation, or a wind generater with a gentle breeze. The second input provides additional power to the load, but the first power source need not be is connected to switch over just because it is marginally low, and power can continue to be extracted to the extent that it is available.

Turning now to the control function of the DC-DC converter, the output converter can be controlled by feed back of the output parameters using the well know techniques of converter design.

Control of the input converter is more involved, because it has dual purposes, which are in conflict. Over time, the input power $p_i$ must equal the output power $p_o$ (ideally) for the voltage $v_s$ of the storage capacitor $C_s$ to be bounded. Any momentary differences are stored as energy $w_s$ in the storage capacitor.

$$w_s = \int p_i dt - \int p_o dt + W_s \qquad 6$$

For the voltage $v_s$ of the storage capacitor $C_s$ to be bounded, in steady state:

$$i_i = \frac{v_o i_o}{v_i} \qquad [7]$$

Since $v_i$ is in the denominator, [7] is negative resistance. The input modulator is used to modify the input characteristics to be compatible with the power source. The input may have negative resistance, infinite resistance or positive resistance, and may be a DC input or it may be adapted with a full wave rectifier for an AC input. Other functions could be implemented for special purposes, but in describing the control methods, five cases will be considered.

1. DC input, negative resistance $$I_i = K_i / v_i \qquad 8$$

2. DC input, infinite resistance $$I_i = K_i \qquad 9$$

3. DC input, positive resistance $$I_i = V_i K_i \qquad 10$$

4. Rectified AC input, infinite resistance $$|i_i| = K_i, \; K_i = f|\sin(\omega)| \qquad 11$$

5. Rectified AC input, positive resistance $$|i_i| = |v_i| K_i \qquad 12$$

Case 5 is a high power factor converter.

A set of general expressions can be written for the five cases.

The input power can be generalized as $$p_i = f_v K_i \qquad 13$$

where $K_i$ is the control function and $f_v$ is an input voltage function.

The control function can be generalized as $$K_i = v_o i_o / F_v \qquad 14$$

For the general expression [13] and [14], and in the following analysis, $f_v$ and $F_v$ are as follows:

| Case | $f_v$ | $F_v$ |
|---|---|---|
| 1 | 1 | 1 |
| 2 | $V_i$ | $V_i$ |
| 3 | $V_i^2$ | $V_i^2$ |
| 4 | $|V_i|$ | $\dfrac{V_i}{2|\sin(\omega t)|}$ or* $\dfrac{V_i}{\sqrt{2}}$ |
| 5 | $v_i^2$ | $V_i^2 \sin^2(wt)$ or* $\dfrac{V_i^2}{2}$ |

*The second function for $F_v$ in cases 4 and 5 can be used as simplifying approximation if it is not necessary to account for ripple. At steady state conditions, cases 4 and 5 have AC ripple terms, which are the AC component of the input power term, and which appear on the storage capacitor $C_s$ as a ripple voltage component in $v_s$.

$$p_s = p_i - p_o \qquad 15$$

In both case, 4 and 5, the ripple component will be
$$p_s = -v_o i_o \cos(2\omega) \qquad 16$$

The indefinite integral of [16] gives the energy, $w_s$.

$$w_s = -\frac{v_o i_o \sin(2\omega t)}{2\omega} + W_s \qquad [17]$$

The energy in a capacitor is $$w_s = \tfrac{1}{2} C_s V_s^2 \qquad 18$$

Solving for the voltage squared $$v_s^2 = -\frac{v_o i_o}{\omega C_s} \sin(2wt) + V_s^2 \qquad [19]$$

In controlling the input modulator, feed forward control can be used to minimize the need for feed-back.

Feed forward control is essentially open loop control. Feed forward can be applied with respect to an input parameter, and is unconditionally stable if the following criteria are met:

1. The input parameter and its disturbance can be measured.
2. An algorithm can be applied to the control so as to reduce the error on the output resulting from the input parameter and its disturbances.
3. The feed forward does not change the input parameter so as to increase the error.

With respect to the D-DC converter, three inputs can be identified which are useable as feed forward parameters: input voltage $v_i$, output voltage $v_o$ and output current $i_o$. The parameters $v_o$ and $i_o$ can be combined as their product, output power $p_o$. Efficiency $\eta$ also affects the control, and should be included in the feed forward expressions, either as a measured parameter or an approximation. Second order effects such as heat sink temperature and component values, to the extent that they can be measured, can also be regarded as inputs.

Figure 10:
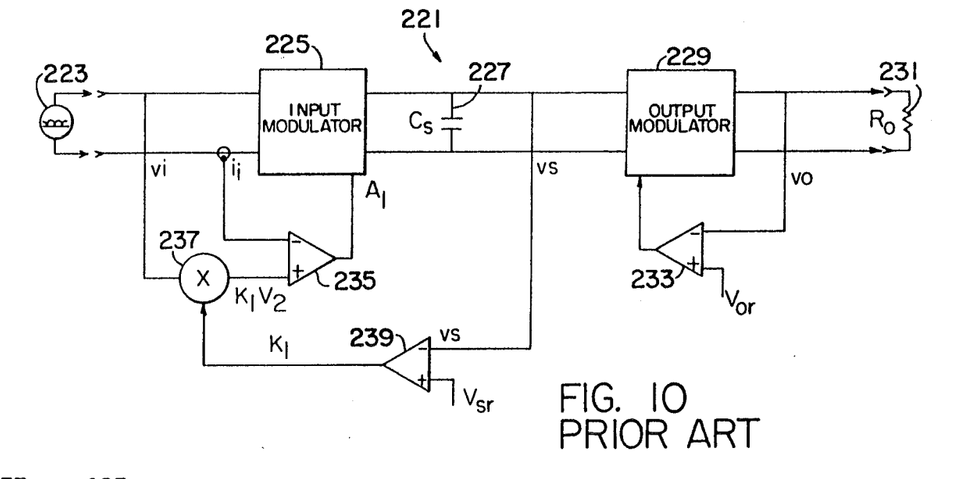
FIG. 10 is a block diagram of prior art control.
Figure 11:
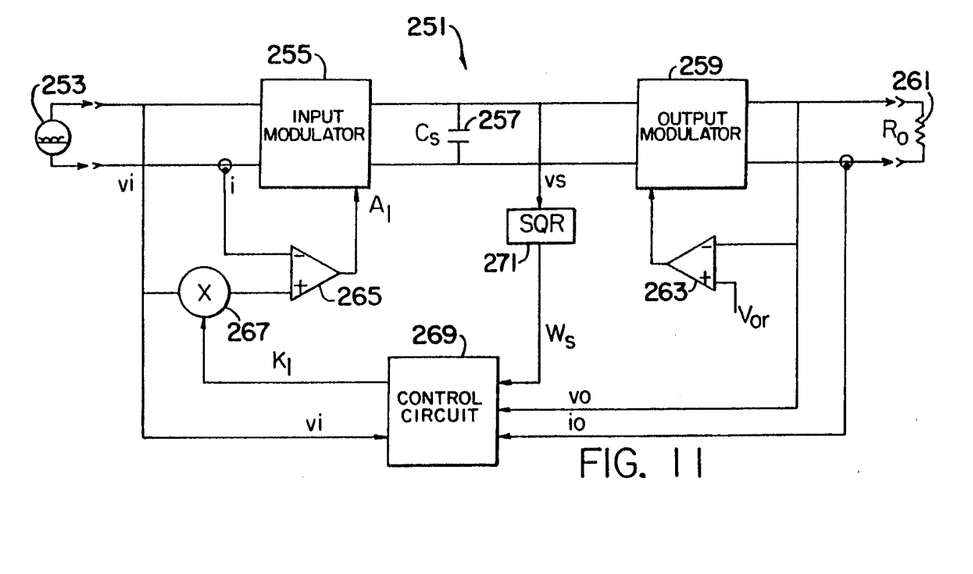
FIG. 11 is a block diagram of feed forward control using this invention.

The method of using feed forward is generally contrasted to feed back by reference to FIGS. 10 and 11. FIG. 10 shows prior art, and is a block diagram of a well know high power factor AC-DC converter. Although not shown, it is known to use feed forward of the input voltage magnitude as $V_i^2$.

In FIG. 11, the feed back amplifier 239 has been replaced with a general feed forward control 269 having $v_o$, $i_o$ and $v_i$ as its primary inputs. A degree of feed back is still necessary, however, and is shown in FIG. 11 as an energy feed back $w_s$ which is derived as the square of the voltage $v_s$ of the storage capacitor $C_s$ 257 using the squaring function 271. (The voltage $v_s$ could be used, but the energy $w_s$ is preferred, because it is a linear function of power).

Feed forward can be beneficial even if it is imprecise. If it is within plus or minus 100% of ideal, the error will be less than if feed forward control were not used. Phase shift will diminish the effectiveness of feed forward as the cosine of the phase shift.

The control methods use energy and power to the extent possible. Energy and power are linear functions, and they transcend the modulators, so no corrections are necessary for the modulator control functions or characteristics, only the losses. The modulator characteristics should be known and considered, however, to avoid measurement errors due to ripple and the switching frequency, for instance.

The input current is controlled on a tight loop as a function of the input voltage and the control constant $K_1$. The overall input control ultimately controls the input power, the product of the input current and input voltage. Accordingly, in all of the relationships developed, an exact equivalent, controlling voltage as a function of input current, could be written for a current source input.

Figure 12:
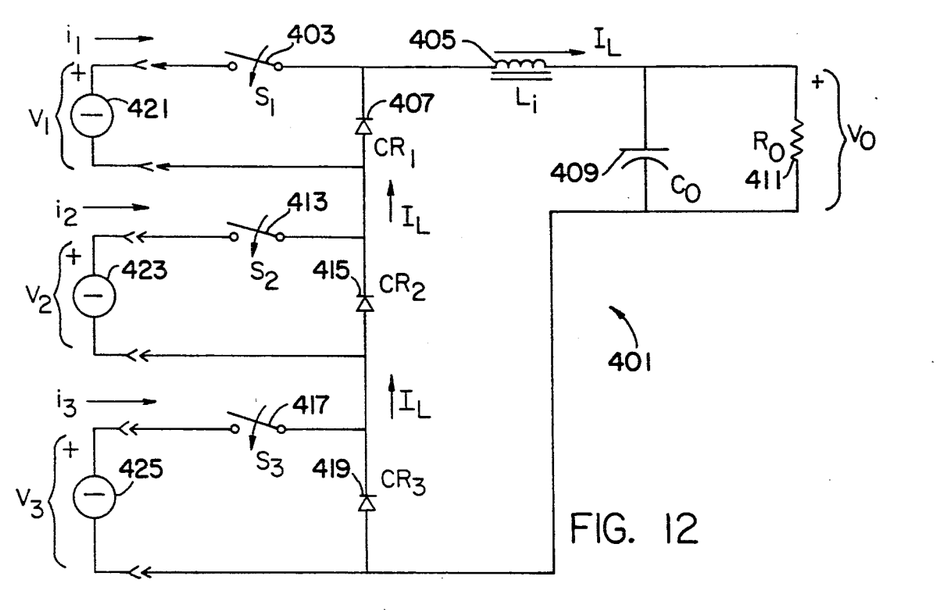
FIG. 12 shows a three input buck converter.

FIG. 12 shows another embodiment of a multiple input buck converter 401, which is particularly useful for a three phase AC-DC converter having high power factor. Three mutually isolated voltage sources 421, 423 and 425 are connected to the circuit through switches 403, 413 and 417. When any of the switches is closed, the voltage source associated with it is placed in a series circuit with an inductor 405. When any of the switches is open, one of the rectifiers 407, 415 and 419 provides a bypass path for the current $I_L$. An output capacitor 109 completes the essential elements of the three input buck converter. The output load is shown as a resistor 411.

In the first voltage source 421, the current $i_i$ will equal $I_L$ when the switch 403 is closed, and will equal zero when it is open. Therefor the average current is given by $$i = D_1 I_L \quad\quad 20$$

$D_1$ is the duty cycle of the first switch 403. Similarly, $$i_2 = D_2 I_L \quad\quad 21$$

$$I_3 = D_3 I_L \quad\quad 22$$

This relationship is similar to the buck converter of FIG. 8, as expressed in equations [4] and [5], but it does not have the limitation that the switch closures be mutually exclusive.

Similar to [3], the output voltage $v_o$ is given by $$v_o = D_1 v_1 + D_2 v_2 + D_3 v_3 \quad\quad 23$$

Three input voltage sources are shown as an illustration, not a limitation. Obviously, any number of voltage sources can be used. This arrangement can be substituted for the arrangement of FIG. 8 in other converters such as the circuits of FIGS. 6 and 7. One input can be the voltage source; a second "input" can be the storage capacitor; a third input can be an auxilliary power source or capacitor, and so forth, provided that either isolation is provided or the ground references are configured to be compatible. It is also obviously possible to use both the teachings of FIG. 8 and the teachings of FIG. 12 together, if the timing and ground references are made compatible.

Figure 13:
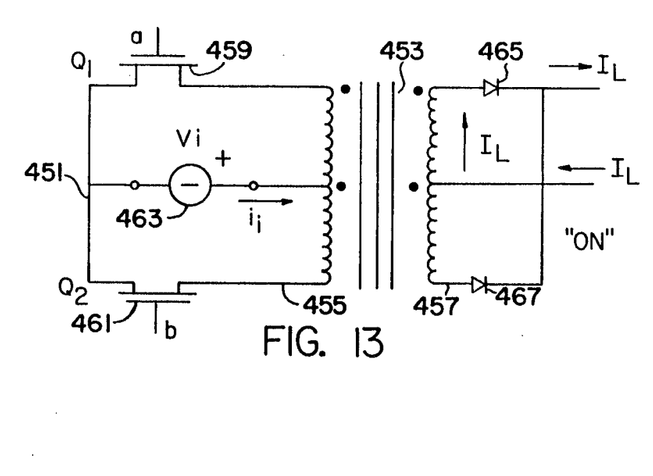
FIG. 13 shows an isolation stage suitable for a multiple input buck converter.
Figure 15:
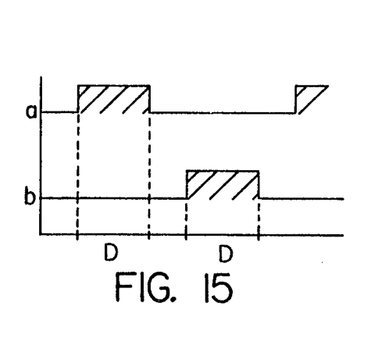

FIG. 13 shows an input circuit 451 suitable for a multiple input buck converter which provides isolation and/or ratioing using a transformer. A DC input 463 is applied to the center tap of a transformer primary 455. Alternating excitation for the transformer core 453 is provided using push pull transistors 459 and 461. The secondary winding 457 of the transformer is rectified by rectifiers 465 and 467. The current $I_L$ in the secondary winding as shown is correct for the time when transistor 461 is "on", assuming that the secondary is in a circuit with a current $I_L$. When either of the transistors is "on", the input current $i_i$ is determined by the transformer ratio and $I_L$. If the excitation of the transistors is pulse width modulated, as shown in FIG. 15, the average input current is a function of the duty cycle D as well.

The circuit of FIG. 13 is shown as an illustration, not a limitation. Other circuits can provide isolation and alternating excitation (or reset) for the core, such as a full or half bridge circuit, a forward converter transformer circuit, and so forth. Obviously not all of the circuits need be isolated.

Figure 14:
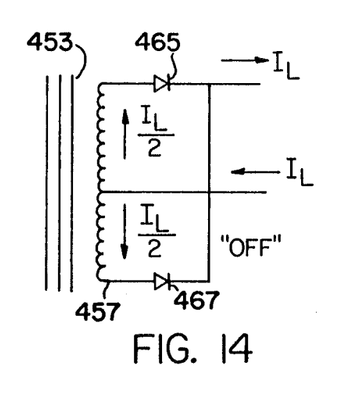

FIG. 14 shows the currents in the secondary 457 when both of the transistors are "off". This will be recognized as the familiar PWM push pull transformer arrangement. Equivalent operation can be achieved with a forward converter arrangement.

Figure 16:
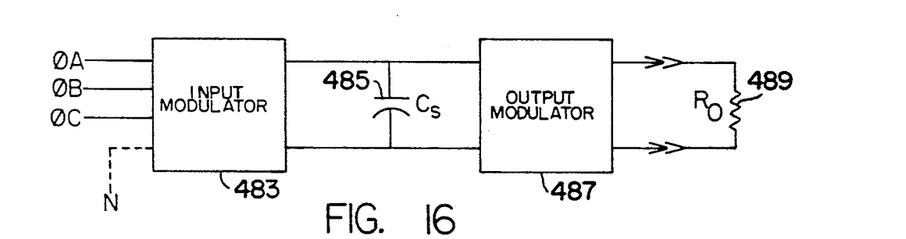

FIG. 16 shows a block diagram of an AC-DC converter having three phase AC input. An output modulator 487 provides output power to an output load, shown as a resistor 489. An input modulator 483 receives input power from three inputs, which may be three phase input power, and delivers power to the output regulator 487. Any instantaneous differences between the input power and the output power are stored as energy in the storage capacitor 485.

Figure 17:
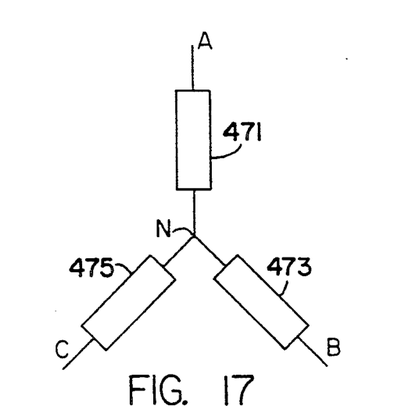
FIGS. 17 and 18 show "Y" and "Δ" three phase input connections.
Figure 18:
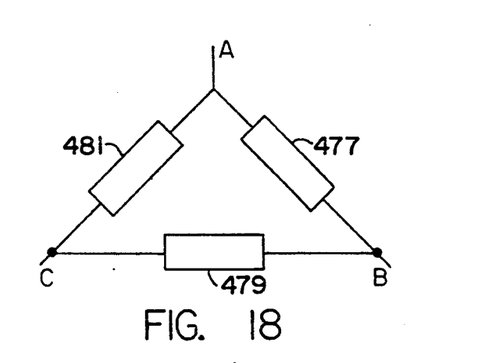

The input power could be "Y" connected as in FIG. 15, or "Δ" connected, as in FIG. 8. In FIG. 17, the input stages for the converter are shown as blocks 471, 473 and 475. In FIG. 18, the input stages for the converter are shown as blocks 477, 479 and 481.

Figure 19:
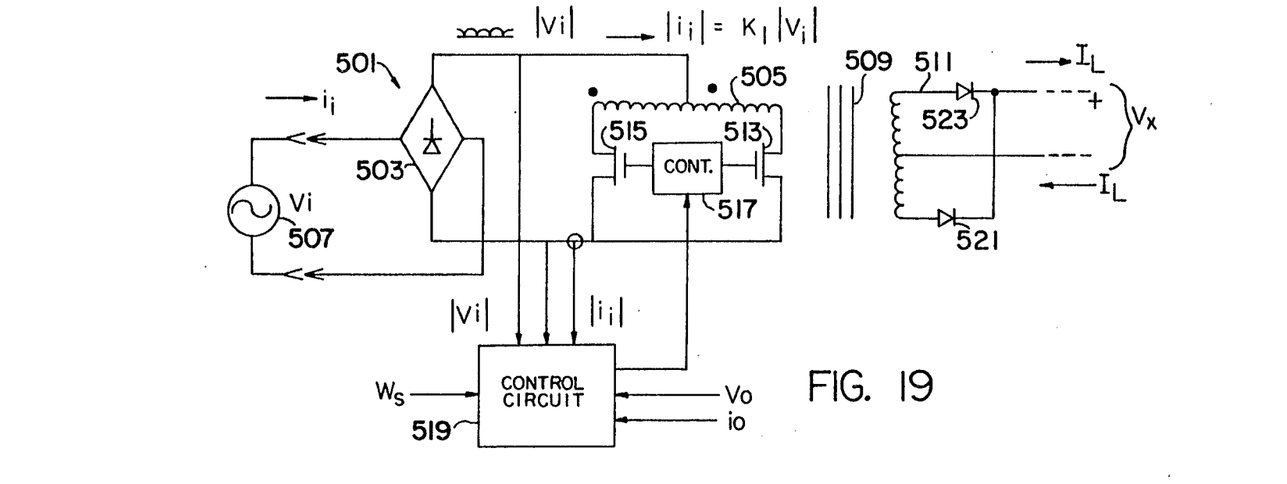
FIG. 19 shows an isolated input stage for a multiphase AC-DC converter having high power factor.

FIG. 19 shows an input stage 501 which would be suitable for the converter of FIG. 16, and is any one of the blocks of FIGS. 17 or 18. The input voltage, shown as a voltage source 507 is full wave rectified by a rectifier bridge 503, and converted to a high frequency excitation for a transformer core 509 in a primary winding 505 by switching transistors 515 and 513. The sequencing and duty cycle of the transistors 513 and 515 is controlled by a controller 517. As shown in FIG. 19, the duty cycle is controlled by an input modulator control 519. The input modulator control 519 may control the input current as a function of $K_i$ and the input voltage $v_i$ for power factor control. The secondary 511 is rectified by rectifiers 521 and 523, just as in FIGS. 13 and 14.

Figure 20:
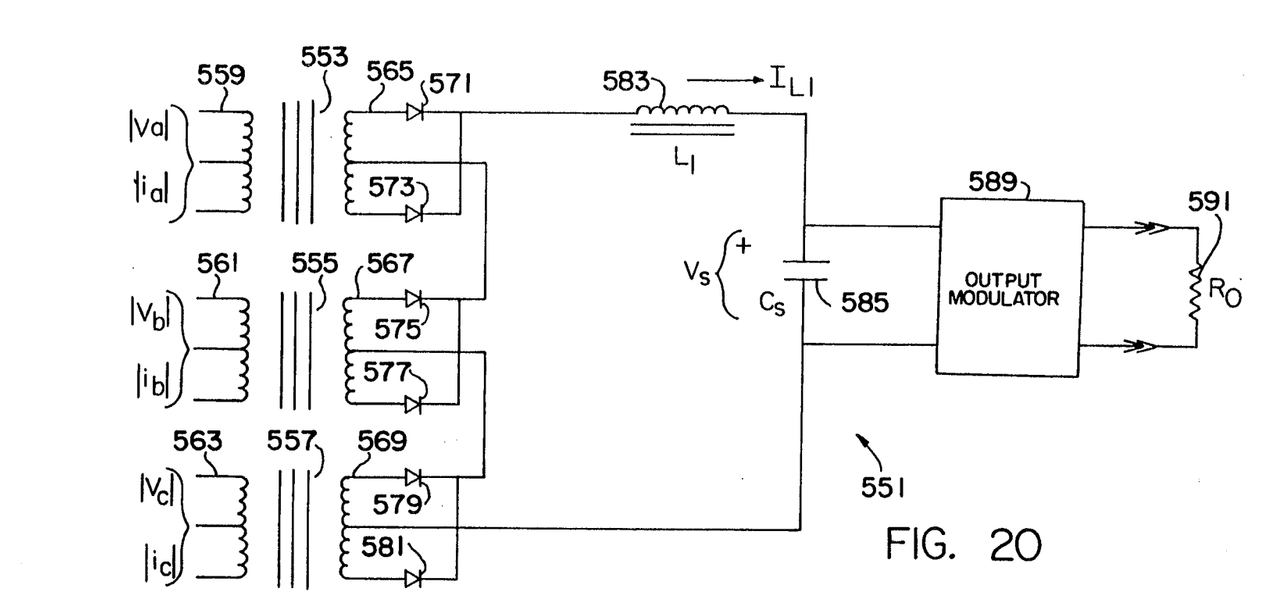
FIG. 20 shows the intermediate stage for a three phase AC-DC converter having high power factor.

FIG. 20 shows the intermediate stage of a three phase AC-DC converter having power factor correction. Three primary circuits 559, 561 and 563 excite three transformer cores 553, 555 and 557 to drive secondaries 565, 567 and 569, which in turn are rectified by rectifiers 571, 573, 575, 577, 579 and 581. This comprises three circuits having their secondaries in series, each of the three circuits may be the circuit shown in FIG. 19, one for each phase of a three phase AC input as shown in FIG. 16.

The three secondary circuits are in series with an inductor

583. An output modulator 589 provides output power to a load shown as a resistor 591. A storage capacitor 585 stores instantaneous differences in power as energy.

With a balanced three phase input of ideal waveform, and control for unity power factor, the power is a constant, the current in the inductor 583 does not vary as a function of the line input frequency and the average voltage on the inductor is constant. It would therefor be possible to take the output voltage from the output of the inductor 583, and the storage capacitor 585 would function as an output filter. However, for any of the other transient conditions which make a positive input resistance desirable, the input modulation function is responsive to the input requirements as well as the load requirements, and instantaneous power differences will result, necessitating a storage capacitor and an output modulation function shown in FIG. 20 as an output modulator 589.

Figure 21:
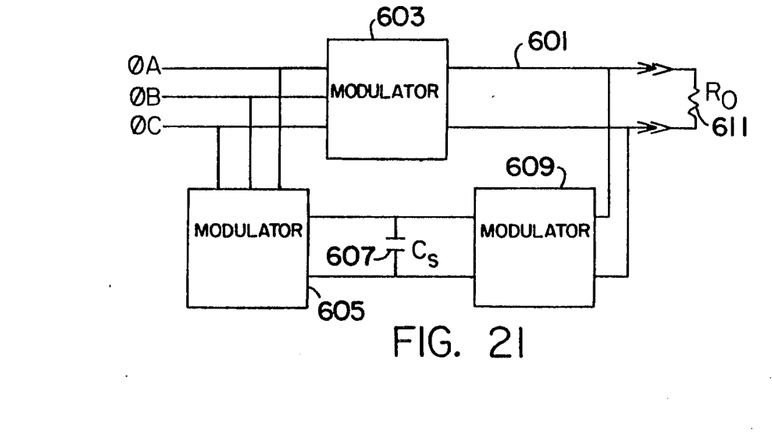
FIGS. 21 and 22 show block diagrams of alternate three phase AC-DC converters having high power factor.
Figure 22:
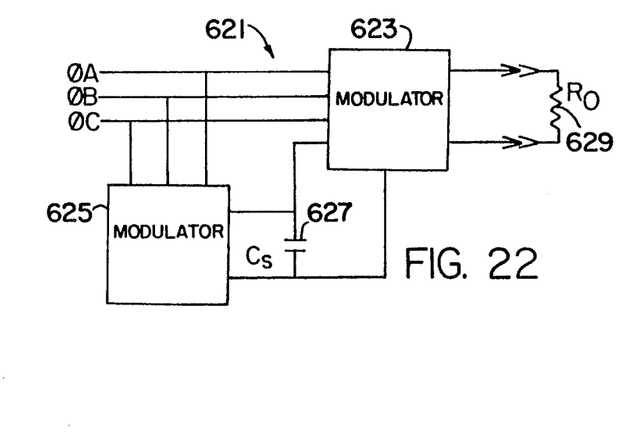

FIGS. 21 and 29 show alternate embodiments having parallel modulators. FIG. 28 is the three phase AC input equivalent of the circuit of FIG. 2, showing the power stages only. In FIG. 22, the storage capacitor 627 is a fourth "input" for the first modulator 623.

Figure 23:
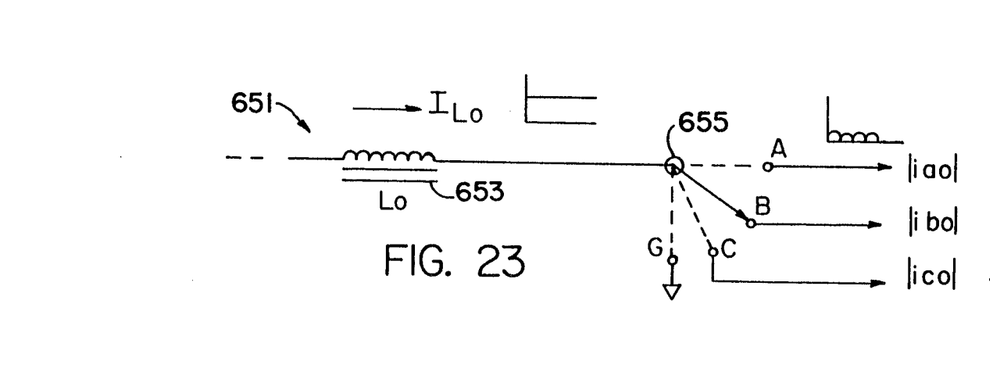
FIGS. 23 and 24 are block diagrams showing three phase outputs using a three output boost converter.

The buck converter and the boost converter are related, and one can be thought of as being the other with the flow of current reversed. Just as the buck converter of FIG. 8 can have multiple inputs, an equivalent circuit of opposite current flow becomes a boost converter with multiple outputs, as shown in FIG. 23, and generally designated 651. An input inductor 653 has a current $I_{Lo}$ which is approximately constant. A switching means shown as a rotary switch 655 directs the current to a plurality of outputs, and the average current on each output will be determined by the current $I_{Lo}$ and the time (duty cycle) that the switch 655 is connected to each output. As shown, the output has the form of a full wave rectified sine wave, so the duty cycle for each switch position "A", "B", "C", is the e absolute value of a sine function. It is thus possible to generate a full-wave rectified three phase output. If the load is a balanced resistive load, the power transfer is constant, as is the average current and average voltage on the inductor.

It is usually assumed that the output of a boost converter must be greater than its source voltage, but in the circuit of FIG. 23, one or more of the outputs can be less than the input, or even zero or negative. It is contemplated that the input of the inductor 653 could be any of the input circuits illustrated above. Therefor FIG. 23 teaches an apparatus and method for deriving a full wave rectified three phase output of any arbitrary frequency, and is therefor an alternate output modulator means for any of the circuits shown. It obviously could be used on its own with a suitable DC input voltage.

FIG. 29 applies the teachings of FIG. 30 to a series circuit, being the boost converter analog of the circuit of FIG. 12. As in FIG. 24, an input inductor 703 has a current $I_{Lo}$ which can be powered from any suitable DC power source, including but not limited to any of the input modulators and storage capacitor arrangements shown above.

Figure 24:
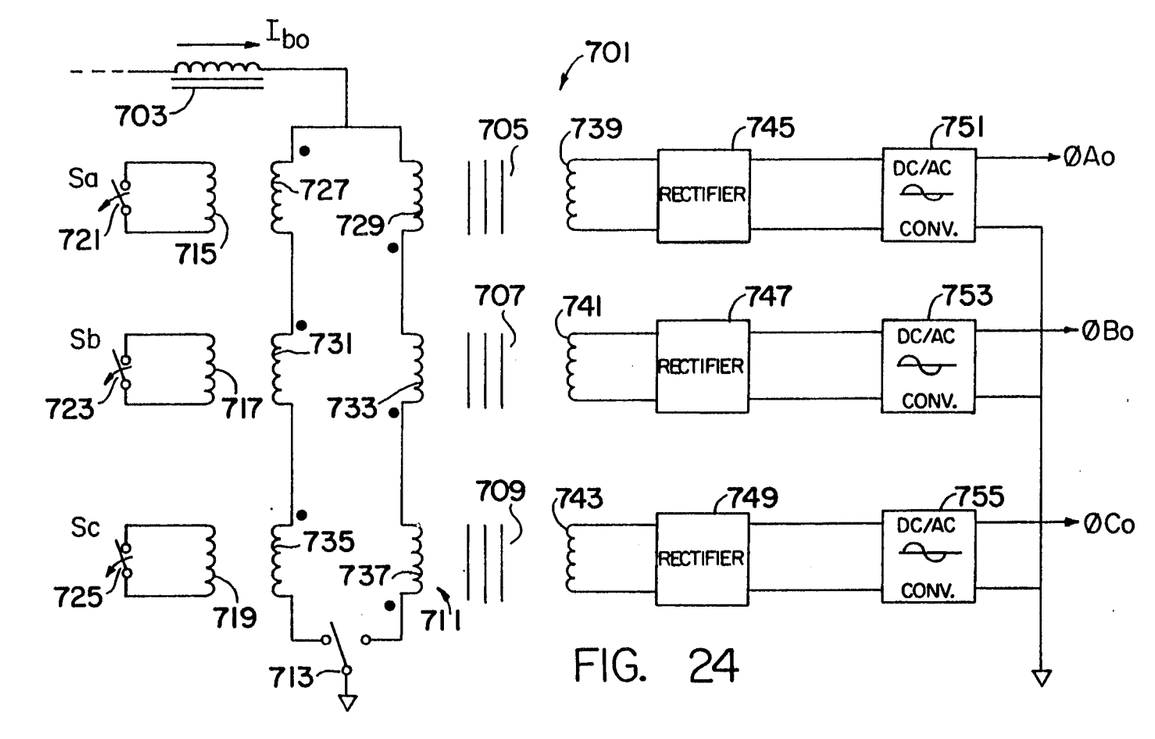

The input current $I_{Lo}$ of the input inductor 703 is switched to provide alternating excitation to transformer cores 705, 707 and 709, using switching means 713. Alternative switching arrangements are obviously substitutable, and would be equivalent. Equal alternating currents flow in all of the primary windings, shown for illustration as series push-pull windings 727, 729, 731, 733, 735 and 737. Being driven by an inductor 703, the primary circuit should not be open-circuit at any time, so the switching means 713 operates at 100% dutycycle. However, both sides of the primary circuit can be grounded simultaneously if the particular circuit control utilizes a shorted primary to effect an "off" time for the entire circuit.

Three secondary circuits 739, 741 and 749 couple the cores 705, 707 and 709 respectively. The output of each secondary circuit 739, 741 and 749 are rectified by full wave rectifiers 745, 747 and 749 respectively.

Also associated with and wound upon each core 705, 707 and 709 is a shorting winding 715, 717 and 719 respectively, and each has a short circuiting means shown as switches 721, 723 and 725 respectively. When any of the switches 721, 723 or 725 are closed, the rate of change of the flux in the associated core 705, 707 or 709 is forced to zero. The primary current will be reflected to the shorting winding & and the closed switch, and the associated output will have zero voltage and current. However, when the shorting switches are open, the primary current will reflect to the secondary, and to the output. The duty cycle of the outputs can be defined as the time when the associated switches are open.

If the duty cycle of each output is the absolute value of a sine function, with appropriate timing, a three phase output can be derived. DC/AC converters 751, 753 and 755 provide an AC output. Whereas in FIG. 23, the duty cycle timeing of the switching means for each output is mutually exclusive, no such constraint is necessary for the circuit of FIG. 24.

The foregoing examples of various embodiments of the apparatus and control methods are given as illustration and not as a limitation. In particular, the modulators are shown as general purpose modulators, it being recognized that one skilled in the art would be able to design suitable modulators using a variety know and yet to be discovered modulators, with or without transformer isolation and ratioing and for any power level and any topology, the choice being a design trade off and not at the point of novelty of the invention.

Likewise the multiple-input buck converter can be implemented in a variety of ways and sizes, using series and/or parallel inputs, with or without transformer isolation and ratioing as is well known to those skilled in the art of buck and buck-derived modulator design.

Likewise, the multiple-output boost converter can be implemented in a variety of ways and sizes, using series and/or parallel outputs, with or without transformer isolation and ratioing as is will known to those skilled in the art of boost and boost-derived modulator design.

The necessity for peripheral accessories such as input and output filters, bias supplies, operational amplifiers and the like is acknowledged, and would be known to those skilled in the art. Their exclusion from the description of any embodiment is not in any way a representation that they are not necessary, but is only a recognition that they are not at the point of novelty, and their use and application is well known to those skilled in the art.

Also, the methods of control are not limited to any specific
implementation or embodiment, and could be designed with analog circuits, digital circuits or a combination of the two, or with a control processor or custom integrated circuit and controller fabrication technologies not yet discovered.

I claim:

1. A power converter of the type generally known as a buck converter, comprising
    a plurality of inputs,
    each of the plurality of inputs being for one of a plurality of power sources
    a plurality of switching means
    each of the plurality of switching means being connected in series with one of the plurality of inputs and one of the plurality of power sources so that each of the plurality of switching means can either connect or disconnect each one of the power sources,
    a plurality of rectifying means, one for each of the plurality of switches and the plurality of power sources
    each of the plurality of rectifying means being connected from the return of on of the plurality of power sources to one of the plurality of switching means so as to comprise a bypass circuit for each of plurality of power sources and the plurality of the switching means when the switching means is open so as to disconnect the power source
    the plurality of power sources and the plurality of switches comprising a series circuit having a plurality of rectifying means for bypassing such that when any of the plurality of switching means is closed, at least one of the plurality of inputs is in series as part of the series circuit, and when any of the plurality of switching means is open, at least one of the plurality of power sources is bypassed by at least one of the rectifying means
    the series circuit comprising the plurality of power sources, the plurality of switching means and the plurality of rectifying means being connected from a ground return to the input of an inductor,, and
    an output capacitor connecting from the output of the inductor to the ground return.

2. The power converter of claim 1 wherein the input voltage of at least one of the plurality of power sources is lower than the voltage of the output capacitor.

3. The power converter of claim 1 having multiple inputs wherein each of the multiple inputs is derived from one phase of a multiple phase AC input voltage source.

4. The power converter of claim 3 having an input modulator control such that power factor correction is provided for the multiple phase AC input voltage source.

5. A power converter of the type generally known as a boost converter comprising
    a plurality of outputs
    each of the plurality of outputs being for one of a plurality of output loads
    a plurality of switching means
    each of the plurality of switching means connecting from one of the plurality outputs to the output of an inductor, and
    an input voltage source means connected to the input of the inductor.

6. The power converter of claim 5 wherein the output voltage of at least one of the plurality of output loads is lower than the voltage of the input voltage source means.

7. The power converter of claim 5 where the input voltage source means is an input modulator circuit having a storage capacitor means.

8. A power converter of the type generally known as a boost converter comprising
    an input inductor having an input current
    a plurality of outputs
    each of the plurality of outputs being for one of a plurality of output loads
    each of the plurality of outputs comprising a series circuit such that all of the plurality of loads are effectively in series and the input current can flow in series through all of the plurality of output loads
    a plurality of switching means,
    each of the plurality of switching means being across one of the plurality of output loads such that when each of the plurality of switching means is closed, the input current flows through one of the plurality of switching means and by passes one of the plurality of output loads, and such that when each of the plurality of switching means is open, the input current flows through at least one of the plurality of output loads, and
    an input voltage source means connected to the input of the input inductor.

9. The power converter of claim 8 having isolation transformer means such that the plurality of output loads can be effectively in series while also being isolated.

10. The power converter of claim 8 wherein at least one of the plurality of output loads has a voltage which is lower than the voltage of the input voltage source means.

* * * * *

UNITED STATES PATENT AND TRADEMARK OFFICE
CERTIFICATE OF CORRECTION

PATENT NO. : 5,144,222
DATED : September 1, 1992
INVENTOR(S) : Edward Herbert It is certified that error appears in the above-identified patent and that said Letters Patent is hereby corrected as shown below:

COLUMN 13 line 55, delete "on" and insert --one--.

Signed and Sealed this

Fourteenth Day of September, 1993

*Attest:*

BRUCE LEHMAN

*Attesting Officer*     *Commissioner of Patents and Trademarks*